May 2, 1933. T. M. HIESTER 1,906,592

BAKING PAN

Filed July 10, 1931

INVENTOR
THEODORE M. HIESTER,
BY
ATTORNEYS

Patented May 2, 1933

1,906,592

UNITED STATES PATENT OFFICE

THEODORE M. HIESTER, OF DAYTON, OHIO, ASSIGNOR TO UNITED AIRCRAFT PRODUCTS, INC., OF DAYTON, OHIO, A CORPORATION OF OHIO

BAKING PAN

Application filed July 10, 1931. Serial No. 549,858.

My invention relates to a new article of manufacture for use as a baking pan.

It is the object of my invention to provide a baking pan having an annular depression with tapering side walls and a central projection in the depression.

In particular, it is my object to provide a pan having an annular depression in which the bottom of the depression, the wall at the top surrounding the depression and the top portion of the extruded portion in the center of the depression will be the same thickness, while the side walls of the depression will be thinner.

It is a further object to provide such a pan out of an integral sheet of metal without soldering, folds, interlocking parts, or other means of attachment of separable pieces.

Referring to the drawing.

Figure 1:
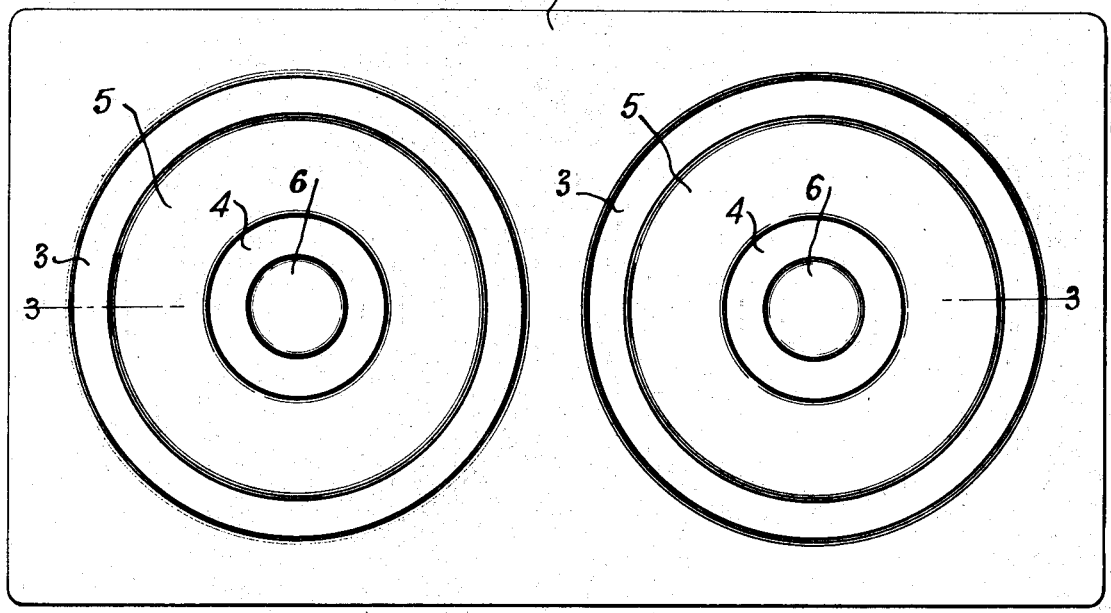
Figure 1 is a top plan view of the inside of the pan.
Figure 2:
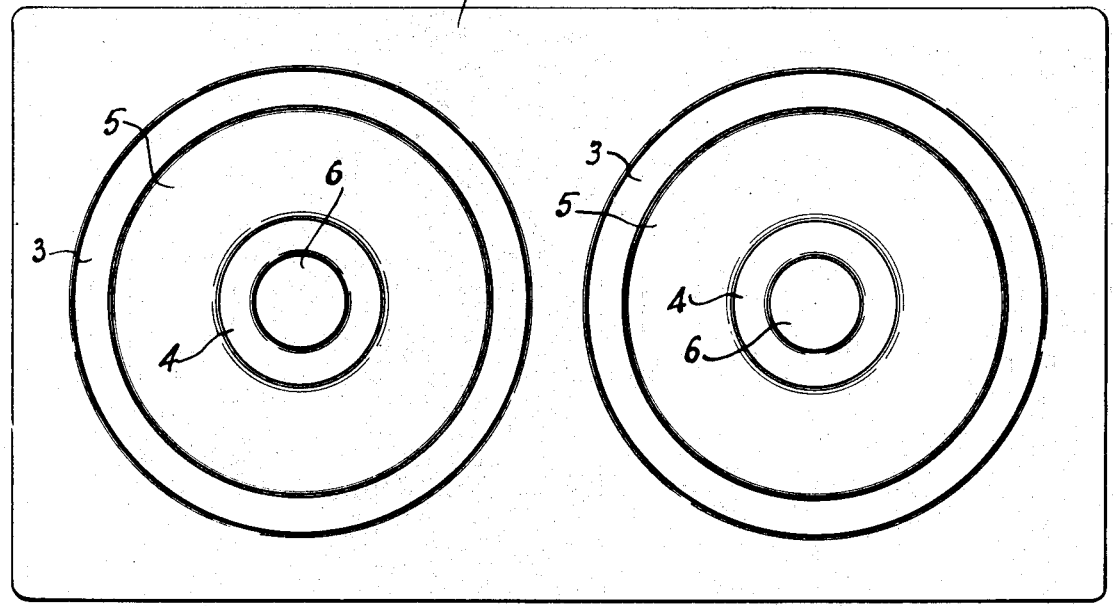
Figure 2 is a rear elevation or plan view of the bottom of the pan.
Figure 3:
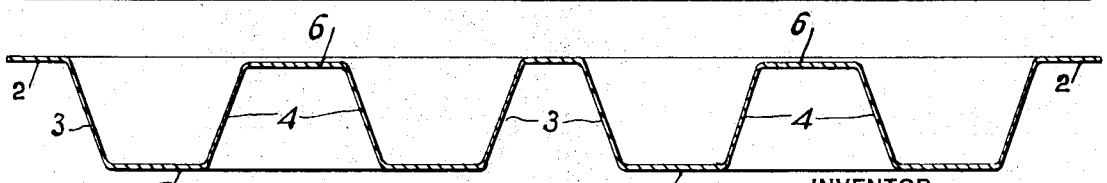
Figure 3 is a section on the line 3—3 of Figure 1.

Referring to the drawing in detail, this pan is formed from a single sheet of metal designated 1. The metal is of uniform thickness prior to being formed. Such thickness is indicated as at 2.

I extrude and roll the outside side wall 3 and the inside side wall 4 leaving the bottom 5 untouched. As a result of this action I have relatively thin side walls 3 and 4 which are about 50% thinner than the original metal thickness indicated at 2 and at 5. I likewise leave the center top member 6 of the same thickness.

In the course of manufacturing I first form a depression in the plate 1 having a bottom 5 and 6 and side walls 3 and then reverse the action and form the side wall 4 moving the portion 6 of the bottom back to its original plane.

The advantage of such a pan is that heretofore the heat being applied directly as on a stove to the bottoms 5 and the side walls 3 and 4, in the prior art pans being of the same thickness as the bottom 5 that portion of the product in the pan would be over cooked at 5 as compared with the portions adjacent the side walls 3 and 4 which are only heated by indirect heat by the air above the stove top.

By providing thinner side walls 3 and 4 I am enabled to secure uniform baking as the loss in radiated heat, due to the transmission of the heat through the air from the stove top, is compensated for by the thinner side walls so that uniform heat is applied to the bottom and sides of the product being treated by the heat.

This is particularly necessary where the product to be produced is an annular one and by "annular" I mean of any configuration that has an inside wall and an outside wall, as it is difficult to so bake a product of that character uniformly.

Heretofore in the art, not only were pans of uniform thickness, but they were subject to the very serious objection that the annular portions were attached by soldering, by swaging, or by interlocking in some form, and in use, due to the expansion and contraction of metals and the very rough usage to which such pans are subjected, particularly in commercial bakeries, the parts became loosened, were difficult to clean because the material would get in the cracks, and difficult to maintain soldered or swaged due to the excessive heat to which the pans are subjected during baking.

It will be understood that I desire to comprehend within my invention such modifications as may be necessary to adapt it to varying conditions and uses.

Having thus fully described my invention what I claim as new and desire to secure by Letters Patent, is:

A new article of manufacture, comprising a baking pan made from a single sheet of metal provided interiorly of its outer margin with a plurality of annular depressions each comprising inner and outer tapered walls, a bottom, and a top member, the latter lying in substantially the same plane with the original sheet, said bottom and top members being of substantially greater thickness than said side walls and all of said parts being integral and presenting when completed a rigid structure in which the thin side walls of the depressions are reinforced and strengthened by the relatively heavier metal in the bottom and top portions of the pan.

In testimony whereof, I affix my signature.

THEODORE M. HIESTER.